United States Patent [19]
Isogai et al.

[11] Patent Number: 5,672,448
[45] Date of Patent: Sep. 30, 1997

[54] MULTI-EXPOSURE SYSTEM FOR HOLOGRAM

[75] Inventors: Emiko Isogai, Hekinan; Satoshi Koike, Kariya; Teiyuu Kimura, Oobu; Hiroshi Ando, Nagoya; Hiroyuki Tatebayashi, Handa, all of Japan

[73] Assignee: Nippondenso Co., Ltd., Aichi-pref, Japan

[21] Appl. No.: 591,145

[22] Filed: Jan. 25, 1996

Related U.S. Application Data

[63] Continuation of Ser. No. 422,619, Apr. 13, 1995, abandoned, which is a continuation of Ser. No. 175,213, Dec. 28, 1993, abandoned.

[30] Foreign Application Priority Data

| Dec. 29, 1992 | [JP] | Japan | 4-361570 |
|---|---|---|---|
| Jan. 20, 1993 | [JP] | Japan | 5-007189 |
| Apr. 19, 1993 | [JP] | Japan | 5-091634 |
| Nov. 8, 1993 | [JP] | Japan | 5-278204 |

[51] Int. Cl.[6] ............... G02B 23/02; G03H 1/28
[52] U.S. Cl. ............ 430/1; 430/2; 430/394; 430/290; 359/22; 359/24
[58] Field of Search ............ 430/1, 2, 290, 430/945, 394; 359/22, 24, 23, 1, 3

[56] References Cited

U.S. PATENT DOCUMENTS

| 3,526,504 | 9/1970 | Celeste | 430/271 |
|---|---|---|---|
| 3,617,274 | 11/1971 | Lin | 430/1 |
| 3,658,526 | 4/1972 | Haugh | 430/1 |
| 3,807,828 | 4/1974 | Johnson et al. | 359/22 |
| 3,891,976 | 6/1975 | Carlsen | 359/22 |
| 4,367,911 | 1/1983 | Graube | 430/2 |
| 4,422,713 | 12/1983 | Grant et al. | 359/3 |
| 4,953,923 | 9/1990 | Wreede | 359/3 |
| 5,098,176 | 3/1992 | Wolf | 359/24 |
| 5,120,621 | 6/1992 | Ramsbetter | 430/2 |
| 5,313,317 | 5/1994 | Saburi et al. | 359/22 |

FOREIGN PATENT DOCUMENTS

| 60-52889 | 3/1985 | Japan . | |
|---|---|---|---|
| 63-305380 | 12/1988 | Japan | 359/22 |
| 197982 | 4/1989 | Japan . | |
| 1159682 | 6/1989 | Japan . | |
| 1321471 | 12/1989 | Japan . | |
| 2-24658 | 1/1990 | Japan . | |
| 2-108092 | 4/1990 | Japan . | |
| 2-24658 | 1/1991 | Japan | 430/2 |
| 3103816 | 4/1991 | Japan . | |
| 2-24658 | 1/1996 | Japan | 430/2 |
| 92/00555 | 1/1992 | WIPO | 430/1 |
| 92 00555 | 1/1992 | WIPO | 430/1 |

OTHER PUBLICATIONS

Johnson et al. "Multiple multiple–exposure holograms" Appl. Opt. 24 Dec. 1985 pp. 4467–4472.

Johnson et al., "Multiple multiple–exposure holograms" Appl. Opt. 24 (24) pp. 4467–4472 (Dec. 1985).

Grime, G.W., "Holographic Diffraction Gratings recorded in Photoresist", in Non–silver Photographic Processes R.J. Cox, ed. ©1975 pp. 275–285.

*Primary Examiner*—Martin Angebranndt
*Attorney, Agent, or Firm*—Cushman Darby & Cushman IP Group Of Pillsbury Madison & Sutro LLP

[57] ABSTRACT

A hologram forming system for forming holograms on multiple exposures is provided. In this system, a holographic recording medium is exposed to light beams at least twice at incident angles different between exposures. The incident angle during each exposure process is determined in a given relation to the thickness of the holographic recording medium which tends to vary as the exposure process is repeated so that the reconstruction wavelengths match with target values without shifting between image colors during reconstruction of the hologram.

4 Claims, 7 Drawing Sheets

FIG. 4(a) FIRST EXPOSURE PROCESS

FIG. 4(b) SECOND EXPOSURE PROCESS

FIG. 4(c) THIRD EXPOSURE PROCESS

MULTI-EXPOSURE SYSTEM FOR HOLOGRAM

This is a continuation of application Ser. No. 08/422,619, filed on Apr. 13, 1995, abandoned; which was a continuation of application Ser. No. 08/175,213, filed on Dec. 28, 1993, now abandoned.

BACKGROUND OF THE INVENTION

1. Technical Field of the Invention

The present invention relates generally to a method and apparatus for forming holograms through multiple exposures which are capable of reconstructing images clearly.

2. Background Art

Multi-exposure systems for forming a hologram are known in the art. Holographic recording media have been conventionally subjected to exposure light beams at different incident angles for recording different reconstruction wavelengths.

Such an approach, however, has a drawback in that it is difficult to apply the exposure light beams at the different recording angles to match diffraction efficiencies of reconstruction wavelengths with target values, thereby causing the variation in diffraction efficiency due to the difference in the incident angle.

SUMMARY OF THE INVENTION

It is therefore a principal object of the present invention to avoid the disadvantages of the prior art.

It is another object of the present invention to provide a method and apparatus for forming a multi-exposure hologram to present fine images with desired constructed wavelengths and diffraction efficiencies, without shifting reconstructed image colors.

According to one aspect of the present invention, a method is provided for forming a multiple-exposure hologram which comprises the steps of providing a holographic recording medium and exposing the holographic recording medium to a light beam at least twice, with each exposure being performed at different incident angles. The incident angles determined so as to compensate for a deviation of a diffraction efficiency of the hologram from a preselected target value.

In the preferred mode of the present invention, the incident angle during each exposure process is determined relative to a rate of change in thickness of the holographic recording medium during the exposure process.

In addition, the incident angle may be changed from preselected greater to smaller angles in each exposure process while the quantity of exposure energy is increased sequentially in each exposure process.

According to another aspect of the present invention, a method is provided for forming a hologram which comprises the steps of: providing a holographic recording medium; exposing the holographic recording medium to a light beam at least twice with each exposure being at different incident angles; and preventing the holographic recording medium from varying in thickness during each exposure process using thickness variation controlling means.

In the preferred mode, the thickness variation controlling means adjusts at least one of: the temperature of the holographic recording medium, the ambient temperature, and the humidity, in order to a constant thickness thickness of the holographic recording medium during each exposure process.

The thickness variation controlling means may alternatively adjust the amount of a swelling agent applied to the holographic recording medium in order to maintain a constant thickness of the holographic recording medium constant.

The thickness variation controlling means may also adjust an ambient pressure around the holographic recording medium for further maintaining the thickness of the holographic recording medium.

The thickness variation controlling means may harden the holographic recording medium prior to the exposure processes for maintaining the thickness of the holographic recording medium constant.

Further, the thickness variation controlling means may apply light to the holographic recording medium or subjecting the holographic recording medium to heat prior to the exposure processes for maintaining the thickness of the holographic recording medium constant.

According to a further aspect of the present invention, a method is provided for forming a hologram which comprises the steps of providing a holographic recording medium and exposing the holographic recording medium to a light beam at least twice, each time at different incident angles. The incident angle is sequentially decreased while the quantity of exposure energy is sequentially increased in each exposure process.

According to a further aspect of the present invention, a method is provided for forming a hologram which comprises the steps of providing a holographic recording medium on a surface of which an optical reflective element is provided. An exposure light beam is applied at least twice, each time at different incident angles, to the other surface of the holographic recording medium opposite the surface on which the optical reflective element is provided. The optical reflective element is displaced a given distance, which is determined in a preselected relation to the incident angle, between each exposure process in a direction which directs the exposure light beam reflected from a given point on a surface of the optical reflective element to a specific point on the holographic recording medium during each exposure process.

According to a still further aspect of the invention, a multi-exposure apparatus is provided for forming a hologram which comprises a light source means for radiating light beams, a holographic recording medium, an angle-adjustable reflective means for orienting the light beams from the light source to the holographic recording medium at different angles, and a control means for controlling the angle-adjustable reflective means to provide multiple exposure processes in a manner wherein an incident angle of the light beams relative to the holographic recording medium during each exposure process is determined according to a variation in thickness of the holographic recording medium in each exposure process.

According to a still further aspect of the invention, a multi-exposure apparatus is provided for forming a hologram which comprises a holographic recording medium, an optical reflective element provided on a surface of the holographic recording medium, a light source means for radiating a plurality of light beams having different wavelengths, one for each exposure process, to the other surface of the holographic recording medium opposite the optical reflective element at different incident angles, and a moving means for moving the optical reflective element along a given path of travel between the exposure processes in a direction which orients the light beam reflected from a given point on a surface of the optical reflective dement to a specific point on the holographic recording medium during each exposure process.

According to a yet further aspect of the invention, a multi-exposure apparatus is provided for forming a hologram which comprises a light source means for radiating light beams, a holographic recording medium, an angle-adjustable reflective means for orienting the light beams from the light source to the holographic recording medium at different angles during each exposure process, and a thickness controlling means for controlling the thickness of the holographic recording medium to remain constant during each exposure process.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
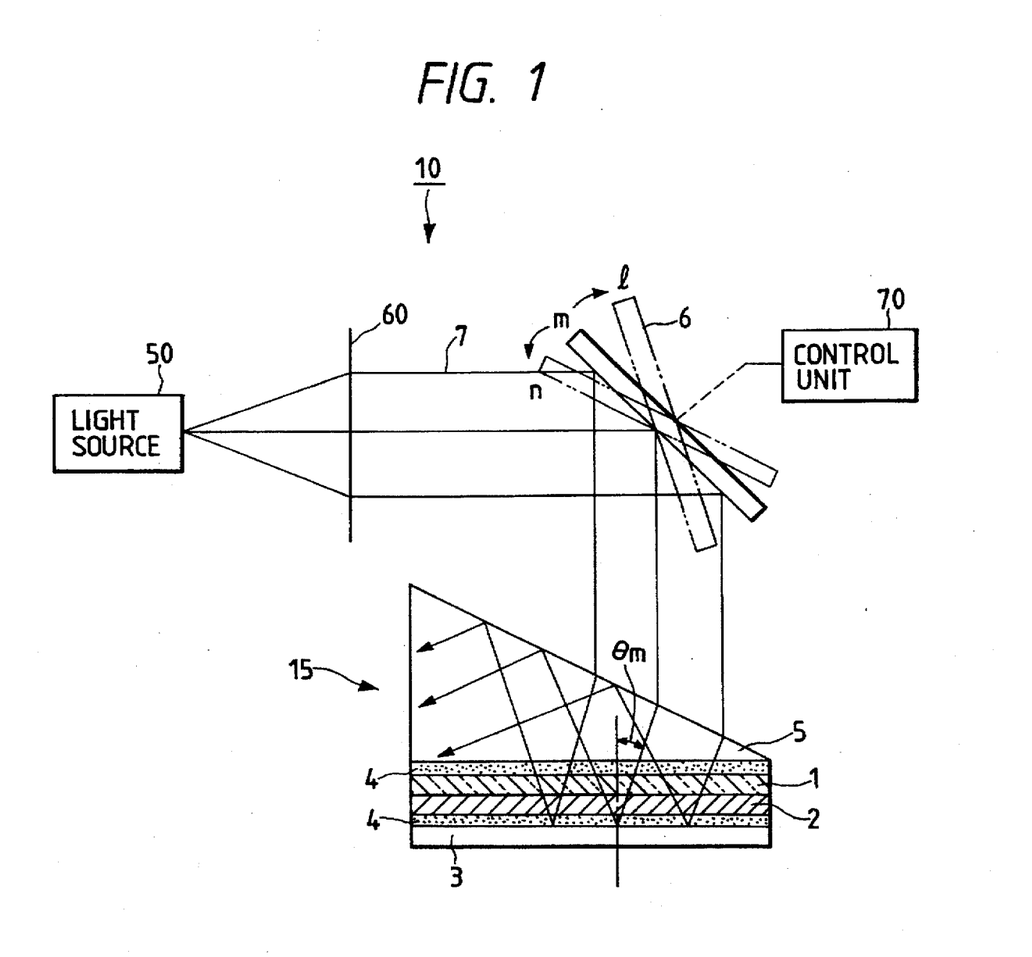
FIG. 1 is an illustration which shows a holographic optical system for forming holograms according to the present invention.

Referring now to the drawings, wherein like numbers refer to like parts in several views, particularly to FIG. 1, a holographic optical system 10 is shown for forming holograms using multiple exposures.

The holographic optical system 10 generally includes a light source 50, a lens system 60, a recording module 15 and a tiltable reflecting mirror 6.

The light source 50 radiates, by way of illustration, three laser beams having a single wavelength which are, in turn, converted into parallel reference laser beams through the lens system 60.

The reflecting mirror 6 is mechanically connected to a control unit 70 by a driving mechanism which can be of any known arrangement for rotational movement to change the mirror position to orient the laser beams 7 from the lens system 60 toward the recording module 15. The laser beams 7 are radiated at different incident angles during each recording exposure process for producing different reconstruction wavelengths during reconstruction of the hologram.

The recording module 15 includes a glass plate 1, a photosensitive medium 2, a mirror 3, index matching fluid layers 4, and a prism 5.

The glass plate 1 is made of such as a transparent and colorless soda glass material. On both surfaces of the glass plate 1, no anti-reflective coating is formed since they are not exposed to the air. The photosensitive medium 2, formed of a holographic recording material such as a dichromate gelatin containing a photochemical sensitizer such as methylene blue, is coated to a thin coat of about 20 μm, and is attached to the bottom surface of the glass plate 1. The mirror 3 is formed of a glass plate. A reflective coating such as aluminum is provided on either surface of the mirror 3. The index matching fluid layers 4 are made of a silicon oil, for example and are disposed between the prism 5 and the glass plate 1 and between the photosensitive medium 2 and the mirror 3 to match the indexes of refraction of the prism 5 and the photosensitive medium 2 with those of the glass plate 1 and the mirror 3, respectively.

The prism 5 is so arranged as to have the recording laser beams 7 from the reflecting mirror 6 propagated thereinto properly when an incident angle (hereinafter, referred to as "exposure angle") of the laser beam into the photosensitive medium 2 is great. If it is possible to apply the laser beams directly to the photosensitive medium 2 at desired incident angles, the prism 5 may be omitted.

In assembling the recording module 15, the glass plate 1, on which photosensitive medium 2 is applied is initially attached to the mirror 3 using an index matching fluid to form an optical single piece preassembly. This preassembly is then attached to the prism 5 using an index matching fluid.

In operation, when a hologram is recorded, the photosensitive medium 2 is subjected to multiple exposure of light wherein the incident angle of the laser beams 7 shifts from greater to smaller angles while the quantity of exposure energy is changed from a smaller one to a greater one in a manner as described below. The increase in exposure energy is necessary because interference fringes usually become difficult to form as the incident angle of the laser beams to the photosensitive medium is increased, and repeated exposures causes the photosensitive medium to be hardened, making it more difficult to form the interference fringes.

In practice, the control unit 70 activates the light source 50 to radiate the three laser beams 7 having the same wavelength, and orients the mirror 6 to an angular position (l), as shown in FIG. 1, so that the recording module 15 is exposed to the laser beams 7 incoming at a preselected greatest exposure angle $\theta_m$ with a preselected smallest mount of exposure energy. Subsequently, the mirror 6 is rotated to an angular position (m) to shift the exposure angle $\theta m$ to a preselected middle angle, and subjects the photosensitive medium 2 to a preselected middle mount of exposure energy. Finally, the mirror 6 is further rotated to an angular position (n) to change the exposure angle $\theta m$ to a preselected smallest angle, and subjects the photosensitive medium 2 to a preselected greatest amount of exposure energy. In this way, the incident light beams radiated on the photosensitive medium 2 and the light beams reflected from the mirror 3 interfere with each other to form interference fringes inside the photosensitive medium 2, each producing a different reconstruction wavelength.

The exposure angle (i.e., recording incident angle) $\theta_m$ is given by the following relation.

$$\lambda\cos\theta_m = \lambda_0 \cdot \cos[\sin^{-1}\{(\sin\theta)/n\}] \cdot M_z$$

where $\lambda$ is the wavelength during reconstruction of the hologram, $\lambda_0$ is the wavelength during a recording of the hologram, $\theta$ is a reconstruction angle, n is an index of refraction of the photosensitive medium, and $M_z$ is an expansion coefficient (equalling (the thickness of the photosensitive medium during the reconstruction process)/(the thickness of the photosensitive medium during the recording process)). In this embodiment, assume that the recording wavelength $\lambda_0$ is 514.5 nm, target reconstruction wavelengths $\lambda$ are 470 nm, 520 nm, and 620 nm, for the reconstruction angle $\theta$, incident and exiting angles both are set to 45 deg, the index of refraction n is 1.52, the expansion coefficients $M_z$ are 0.964 at the reconstruction wavelength $\lambda$ of 620 nm, 0.989 at the reconstruction wavelength $\lambda$ of 520 nm, and 1.000 at the reconstruction wavelength $\lambda$ of 470 nm.

From the above equation, it is found that when the reconstruction wavelengths $\lambda$ are 620 nm, 520 nm, and 470 nm, the exposure angles $\theta_m$ are 44.9 deg, 30.0 deg, and 14.3 deg which correspond to the l, m, and n angular positions of the reflecting mirror 6, respectively, as shown in FIG. 1.

To determine the optimum quantity of exposure energy, a series of exposure tests were performed while shifting the exposure angle from 44.9 deg to 14.3 deg through 30.0 deg. The tests results showed that the desirable quantities of exposure energy are 200 mj/cm² at the exposure angle of 44.9 deg, 210 mj/cm² at the exposure angle of 30.0 deg, and 265 mj/cm² at the exposure angle of 14.3 deg.

Figure 2:
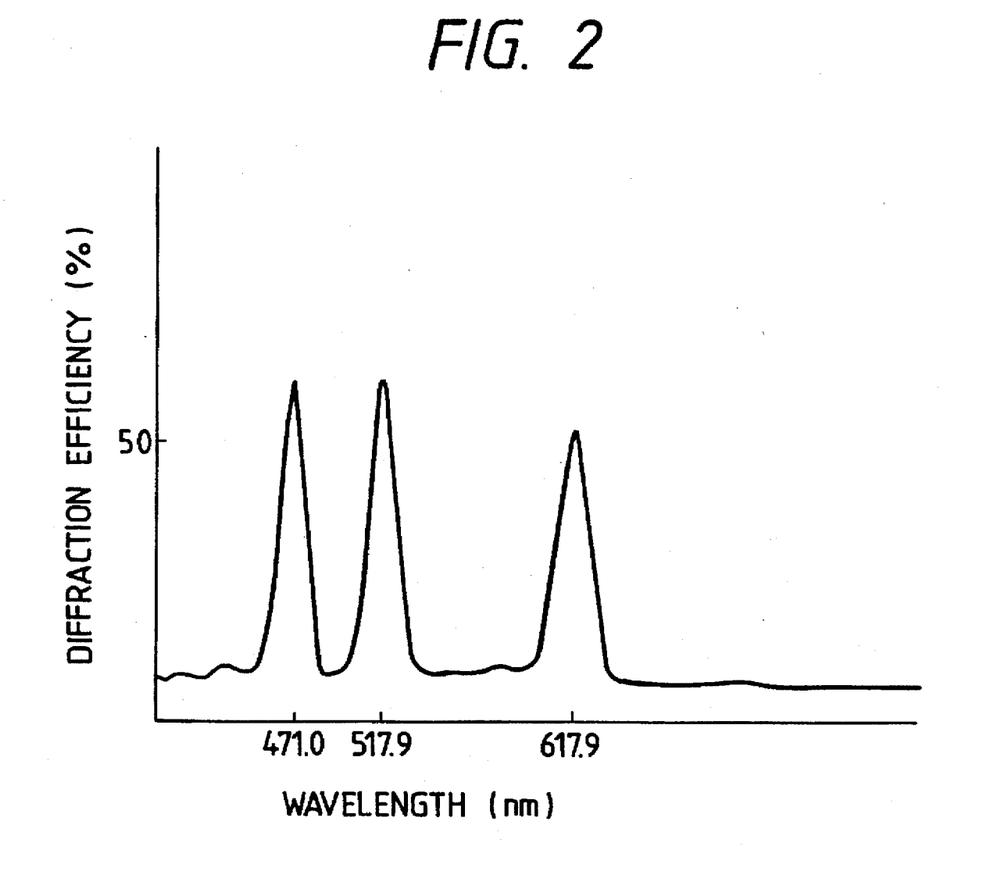
FIG. 2 is a graph which shows the relation between constructed wavelengths and diffraction efficiencies of a hologram produced by a holographic optical system of the invention.

FIG. 2 shows the diffraction efficiencies at different reconstruction wavelengths of a hologram plate formed by developing the multiply-exposed photosensitive medium 2 under the above conditions. It will appear from the graph that the deviations of actual reconstruction wavelengths from the target reconstruction wavelengths are sufficiently compensated for, and extremely uniform diffraction efficiencies are obtained.

An alternative embodiment, which is a modification of the above mentioned first embodiment, will be discussed below. The holographic optical system of this embodiment is different from the above mentioned first embodiment only in that a rate of change in thickness (i.e., expansion coefficient) Mz (the suffix "z" indicates the number of exposure processes) of the photosensitive medium 2 during each exposure process is initially projected or estimated in a manner, as discussed below, to determine the incident angles of the laser beams 7 to the photosensitive medium 2 in each exposure process. Other arrangements and operation are the same as in the first embodiment and explanation thereof in detail will be omitted here.

The rate of change in thickness $M_z$ is, as discussed previously, determined basically in the relation of (the thickness of the photosensitive medium during reconstruction process)/(the thickness of the photosensitive medium during exposure process). In this second embodiment, however, it is estimated based on the relation of (actual reconstruction wavelength during the reconstruction process)/(target reconstruction wavelength). This is based on the fact that the wavelength of light during the reconstruction of a hologram is changed in proportion to the thickness of the photosensitive medium 2, wherein a decrease in the thickness causes the reconstruction wavelength to be shifted to shorter wavelengths.

For example, when the recording wavelength $\lambda_0$ is 514.5 nm, the exiting angles of the reconstructed light beams are 45 deg, and the target reconstruction wavelengths $\lambda$ are selected as 470 nm, 520 nm, and 620 nm, the rate of change in thickness Mz has been found to be 0.964 ($M_{z=1}$), 0.989 ($M_{z=2}$), and 1.0 ($M_{z=3}$).

Therefore, from the equation of $\lambda\cos\theta_m = \lambda_0 \cdot \cos[\sin^{-1}\{(\sin\theta)/n\}] \cdot M_z$, as referred to in the first embodiment, the exposure angle (i.e., recording incident angle) $\theta_m$ may be determined using the rate of change in thickness $M_z$.

Figure 3A:
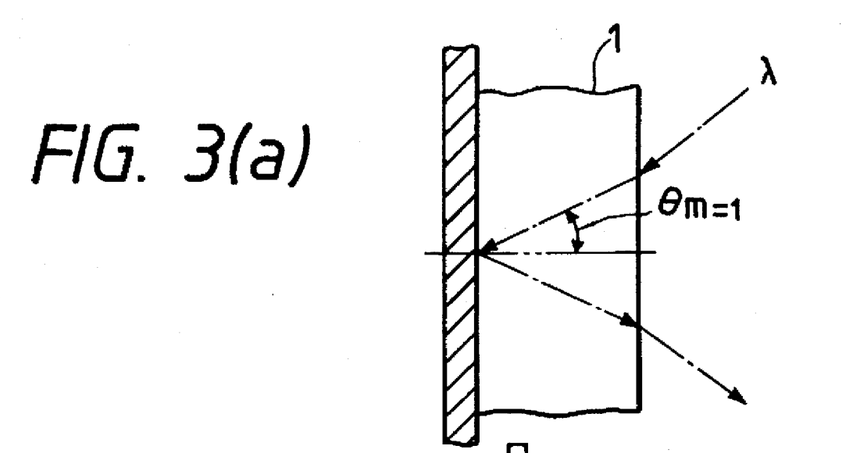
FIGS. 3(a), 3(b), and 3(c) are partially cross-sectional views each showing an incident angle during each exposure process.
Figure 3B:
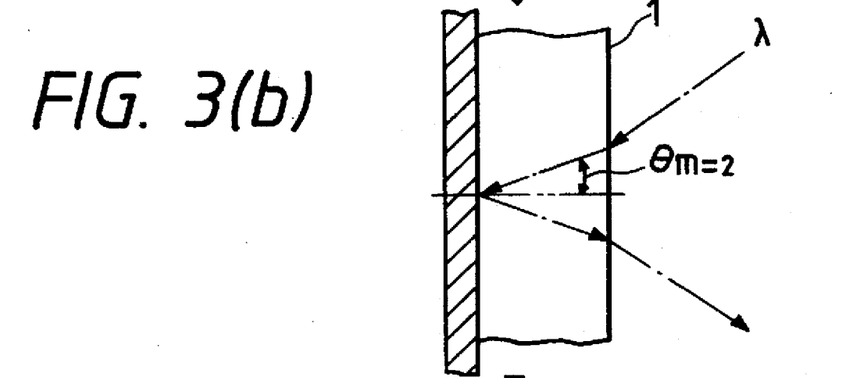
Figure 3C:
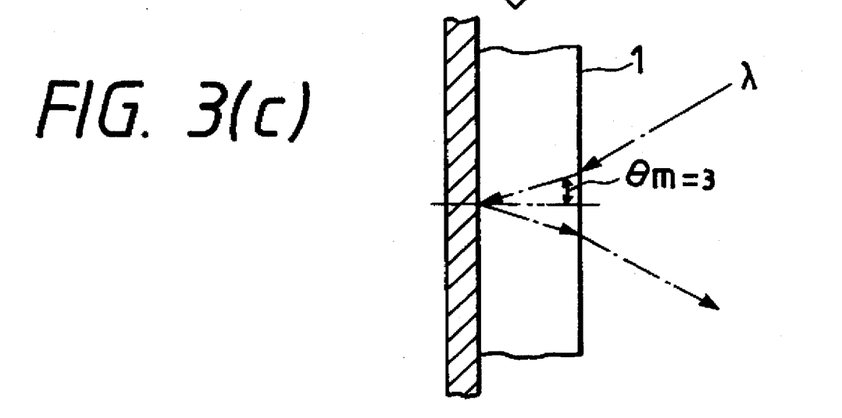

In operation, when the exposure process is carried out three times in the same manner as in the first embodiment for forming a hologram which will produce colors of three different reconstruction wavelengths, the mirror 6 is first set to apply the laser beams 7 to the photosensitive medium 2 at an incident angle $\theta_{m=1}$, as shown in FIG. 3(a), which is calculated according to the above equation. Subsequently, the mirror 6 is rotated to shift the exposure angle $\theta_{m=1}$ of the laser beams 7 to a smaller exposure angle $\theta_{m=2}$, as shown in FIG. 3(b). Finally, the mirror 6 is further rotated to change the exposure angle $\theta_{m=2}$ of the laser beams 7 to a further smaller exposure angle $\theta_{m=3}$, as shown in FIG. 3(c).

In the above embodiments, the hologram is recorded using a single beam interference method. It should be noted however, that the invention is not limited to same and that the exposure using two-beam interference method wherein parallel beams are applied to one surface of the photosensitive medium 2, while divergent beams are applied to the other surface thereof, may be use in lieu thereof.

Figure 4A:
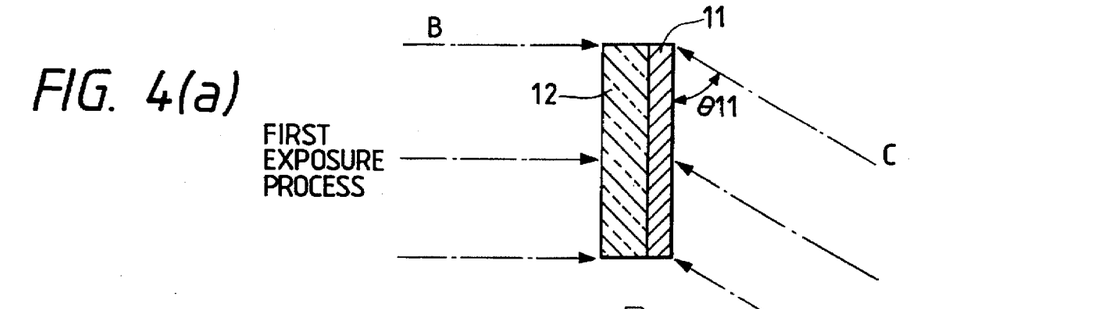
FIG. 4(a), 4(b), and 4(c) are partially cross-sectional views each showing an incident angle during each exposure process in an alternative embodiment of the invention.
Figure 4B:
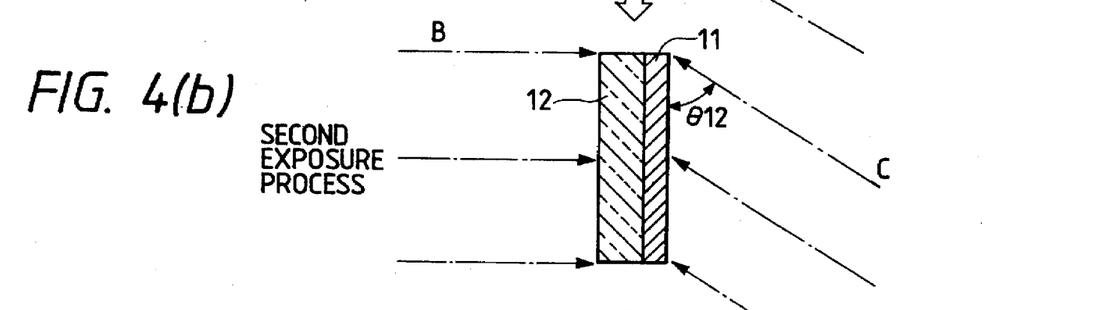
Figure 4C:
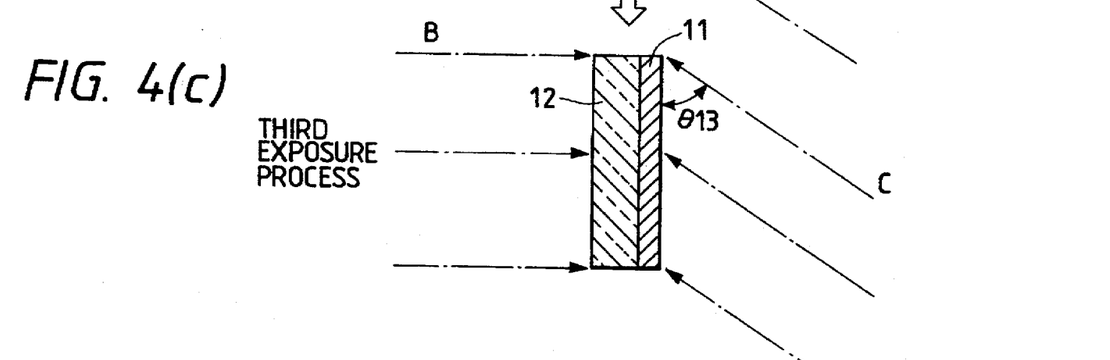

Referring to FIGS. 4(a), 4(b), and 4(c), an alternative embodiment will be described hereinbelow.

This embodiment is directed to an arrangement wherein the thickness of the photosensitive media 2 is maintained constant so that actual reconstruction wavelengths of the hologram may coincide with target reconstruction wavelengths.

As shown in the drawings, the exposure is performed using two-beam interference method. The recording module 15 includes a transparent soda glass plate 12 and a photosensitive medium 11 which is formed of a holographic recording material such as a dichromate gelatin having a constant thickness. The laser beams radiated from the light source are divided by a beam splitter (not shown) into two bundles of beams, one being reflected on a hologram-recording concave mirror to be formed into object beams (i.e., signal beams) which are directed perpendicular to the left surface, as viewed in the drawing, of the photosensitive medium 11, the second being provided as reference beams which are applied to the right surface of the photosensitive medium 11 at incident angles $\theta_{11}$, $\theta_{12}$, and $\theta_{13}$ which may be determined in the same manner as in the above embodiments.

With the above hologram recording processes, interference fringes are recorded in the photosensitive medium 11. In the hologram recording processes, the thickness of the photosensitive medium 11 may be made constant in the following manners.

(1) The temperature of the photosensitive medium 11 is controlled. Alternatively, the ambient temperature and/or the humidity are adjusted so as to maintain the thickness of the photosensitive medium 11 constant.

(2) A swelling agent is added to the photosensitive medium 11. The amount of swelling agent is modified for maintaining the thickness of the medium 11 constant.

(3) The ambient air pressure around the photosensitive medium 11 is controlled.

(4) A light beam is radiated to the photosensitive medium 11 prior to the hologram exposure or the heat is applied to harden the photosensitive medium 11 for preventing the thickness thereof from being changed during the exposure.

According to the above, the thickness of the photosensitive medium 11 is maintained at a constant value during the multiple exposure processes for matching the reconstruction wavelengths of the hologram with target values with high accuracy. In addition, even when information images are produced using a hologram in which a concave mirror pattern is recorded, the images are displayed clearly without shifting between colors.

Figure 5:
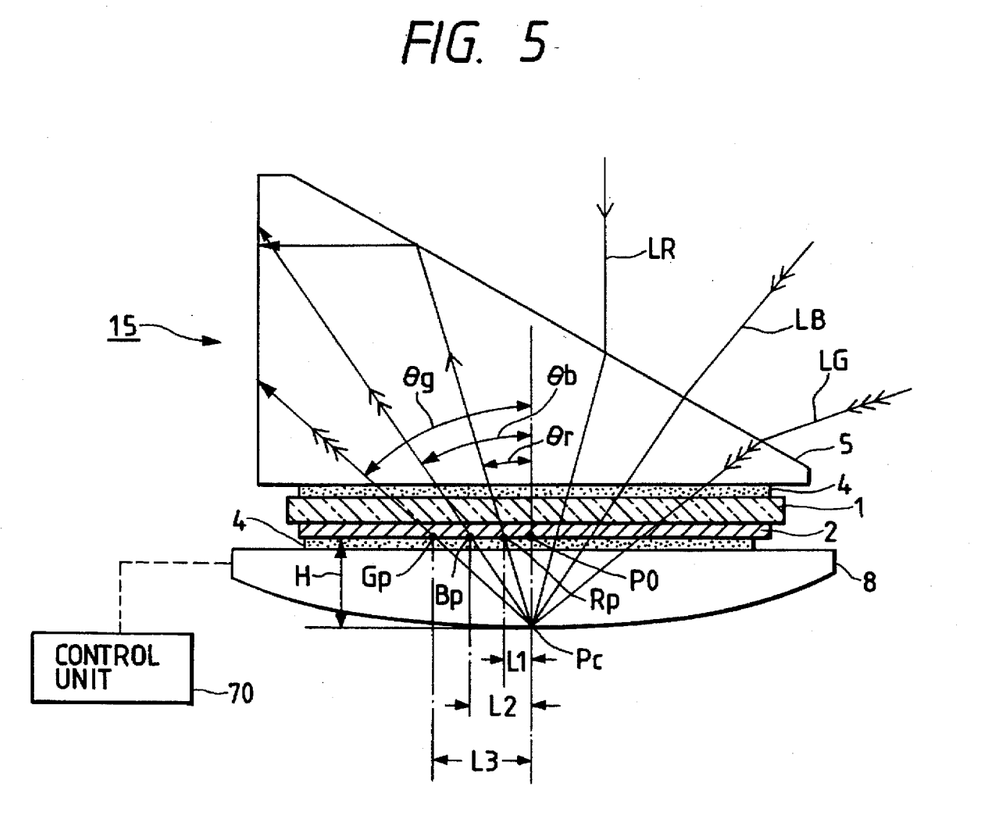
FIG. 5 is a cross-sectional view which shows a holographic recording module according to an alternative embodiment of the present invention.

Referring to FIG. 5, a holographic optical system is shown according to an alternative embodiment of the present invention.

The holographic optical system of this embodiment includes substantially the same construction as in the above mentioned first embodiment. However, it is different therefrom in that the light source 50 (not shown in FIG. 5 for the sake of simplicity) includes a laser generator which is designed to radiate three color laser beams: red (LR: wavelength=647.1 nm), green (LG: wavelength=514.5 nm), and blue (LB: wavelength=476.2 nm). A concave mirror (spherical concave mirror) 8 is arranged below the photosensitive medium 2 through index matching fluid layer 4 in drive connection with the control unit 70 through a sliding mechanism (not shown). The concave mirror 8 may alternatively be provided with a parabolic concave mirror, an elliptic concave mirror, or other suitable optical reflective elements having a preselected radius of curvature.

In operation, when a hologram is recorded, the photosensitive medium 2 is subjected to the multi-exposure in a manner wherein the laser beams LR, LB, and LG are applied sequentially to the photosensitive medium 2 at different incident angles in the same way as in the first embodiment, while between each recording process, the concave mirror 8 is displaced a preselected distance along a given path of travel in a direction which orients any of the laser beams LR, LB, and LG reflected from a given point on the concave mirror 8 to a specific point on the photosensitive medium 2 for preventing image colors during the reconstruction of the hologram from being shifted.

The degree of displacement of the concave mirror 8 is determined in the following manner.

As shown in FIG. 5, it is assumed that the central position of the concave mirror 8 during a first exposure process is defined at Pc, a point of intersection between a perpendicular line extending from the central point Pc and an outer surface of the photosensitive medium 2 is $P_0$, the central thickness of the concave mirror 8 is H, reflection angles of the laser beams LR, LB, and LG at the central point $P_0$ of the concave mirror 8, that is, re-incident angles thereof to the photosensitive medium 2 are θr, θb, and θg, and points of intersection between the reflected laser beams and the outer surface of the photosensitive medium 2 are Rp, Bp, and Gp, respectively. An integral L1 between the points $P_0$ and Rp is determined according to the relation of L1=H·tanθr, an interval L2 between the points $P_0$ and Bp is expressed as L2=H·tanθb, and an interval L3 between the points $P_0$ and Gp is obtained in the relation of L3=H·tanθg.

Figure 6:
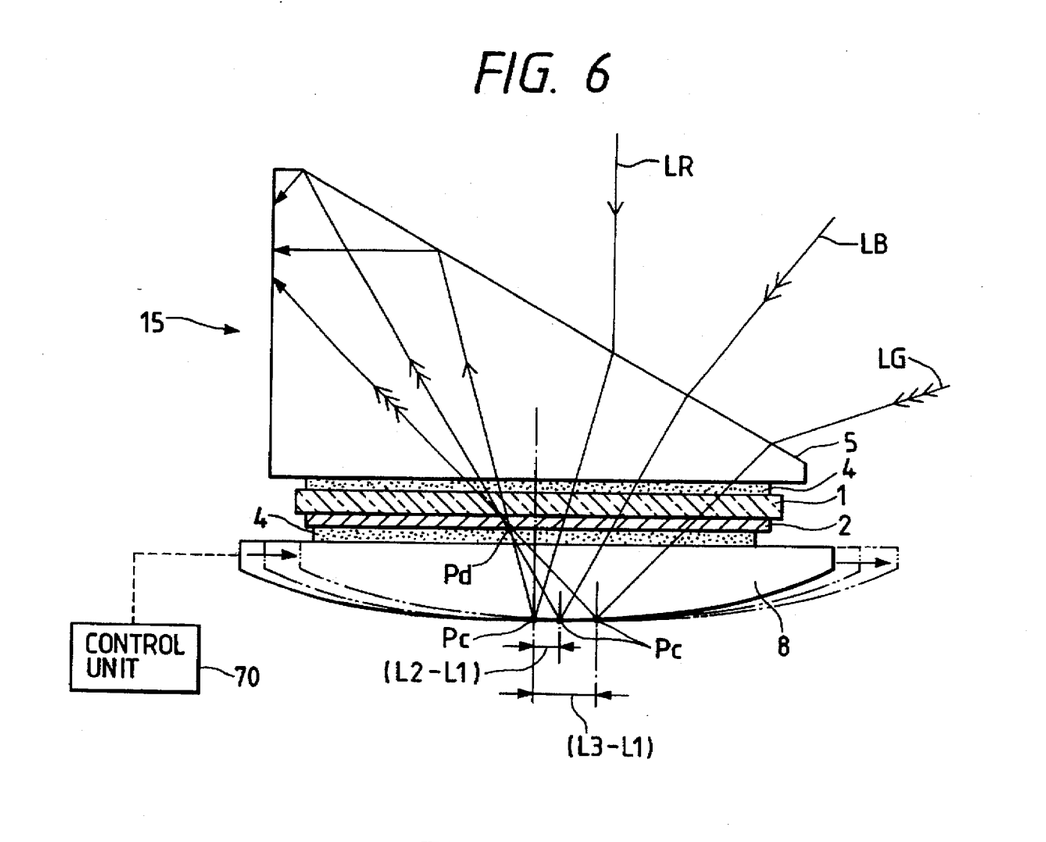
FIG. 6 is a cross-sectional view which shows a displacement of a concave mirror between each exposure process.

Thus, when a second exposure process is performed, the concave mirror 8 is moved a distance (L2−L1) in the right direction, as viewed in FIG. 6, from position in the first exposure process. In addition, when a third exposure process is performed, the concave mirror 8 is further displaced a distance (L3−L1) from the position in the first exposure process. As a result of the displacements of the concave mirror 8 between the exposure processes, the three laser beams LR, LB, and LG reflected on the same point (e.g., the central point Pc) of the concave mirror 8 are propagated through a certain single point Pd on the photosensitive medium 2.

When three target reconstruction wavelengths during reconstruction of a hologram are λr=611 nm, λb=452 nm, and λg=543 nm, and both the incident and exiting angles of the reconstructed light beams are selected as 33.5 deg, the incident angles θr, θb, θg of the three laser beams to the photosensitive medium 2 during exposure processes are determined according to a given relation as follows:

θr=9.375 deg, θb=11.12 deg, θg=28.01 deg

Thus, if the thickness H of the concave mirror 3 is 12 mm, the interval L1 between the points $P_0$ and Rp, the interval L2 between the points $P_0$ and Bp, and the interval L3 between the points $P_0$ and Gp are $L1=12\times\tan 9.375=1.981$ mm $L2=12\times\tan 11.12=2.359$ mm $L3=12\times\tan 28.01=6.383$ mm Accordingly, the displacement (L2−L1) of the concave mirror 8 in the second exposure process and the displacement (L3−L1) in the third exposure process from the position in the first exposure process are determined as follows:

$(L2-L1)=2.359-1.981=0.4$ mm $(L3-L1)=6.383-1.981=4.4$ mm

Figure 7:
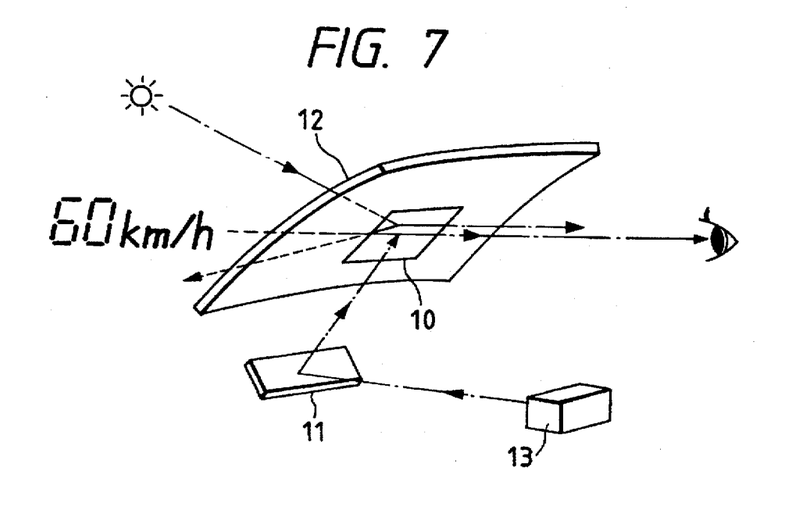
FIG. 7 is a perspective view which shows an example of the use of a hologram formed by a holographic optical system of the invention.

FIG. 7 shows an example of the use of the hologram in a head up display system for automotive vehicles.

A hologram 10 is mounted in or attached to an inside surface of a windshield 12. The hologram 10 records therein the concave mirror 8 so that it offers a function of magnifying the display of information. In addition, the hologram 10 assumes diffraction characteristics which allow only light rays having specific wavelengths (e.g., red, green, and blue, as shown in FIG. 8(b)) which are incident to the hologram at particular angles, to be reflected toward a viewer.

A display unit 13 includes a light source, a liquid crystal display, and a display device for projecting images of information on vehicle speed, for example, to an optical reflective element 11 such as a plane mirror arranged to direct the images projected from the display unit 3 to the hologram 10.

The optical reflective element 11 is designed to reflect light having a given wavelength (e.g., green light) radiated from the display unit 13, and includes a hologram constructed to reflect light having the given wavelength, or a dichroic mirror formed with a reflecting mirror and a dichroic filter for allowing the light having the given wavelength to pass through.

In the head up display system thus constructed, display light (e.g., green light) is radiated from the display unit 13 to the optical reflective element 11 which, in turn, is reflected toward the hologram 10 on the windshield 12 at a preselected incident angle. The hologram then projects the display light to driver's eyes so that a driver may see it without having to divert his or her line-of-sight from the scene ahead of the windshield 12.

Figure 8A:
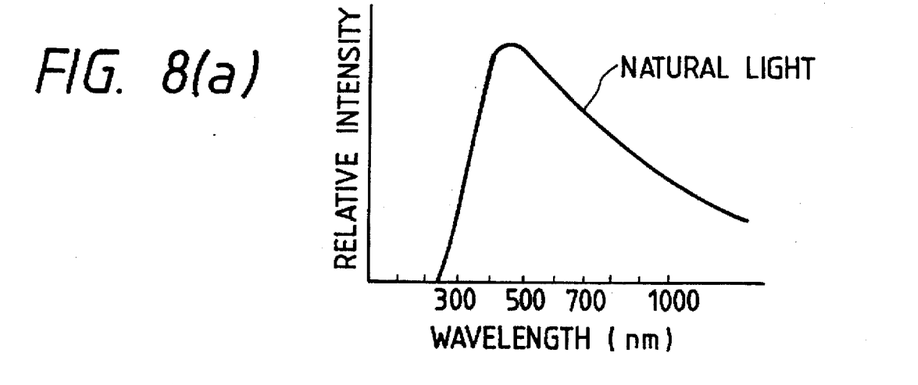
FIG. 8(a) is a graph which shows the relation between wavelength of the natural light and relative intensity thereof.
Figure 8B:
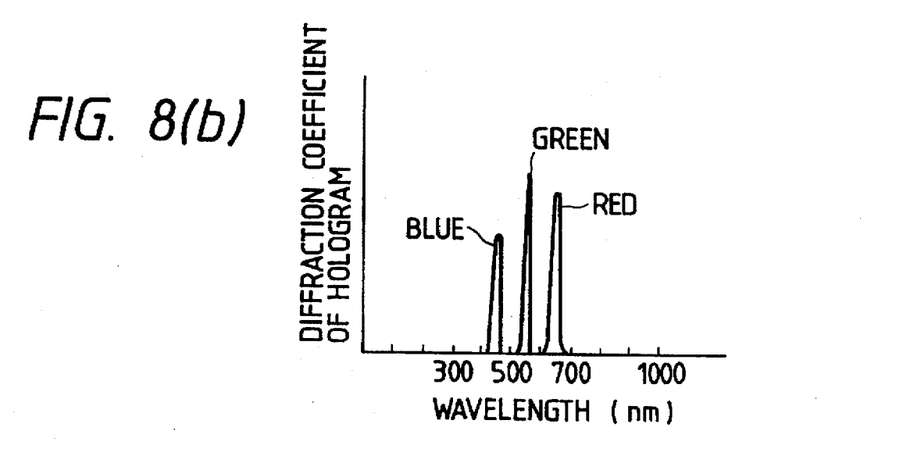
FIG. 8(b) is a graph which shows the relation between wavelength of light reflected on a hologram and diffraction coefficient thereof.

The natural light from the sun, as shown in FIG. 8(a), that is, a background of the scene ahead of the windshield 12 is also propagated to the driver's eyes through the hologram 10. In the case where the hologram is designed to have characteristics reflecting and diffracting only green light, the light from which green spectrum is eliminated arrives at the driver's eyes. This will cause the driver to see the background to be colored violet as a complementary color to green.

Figure 8C:
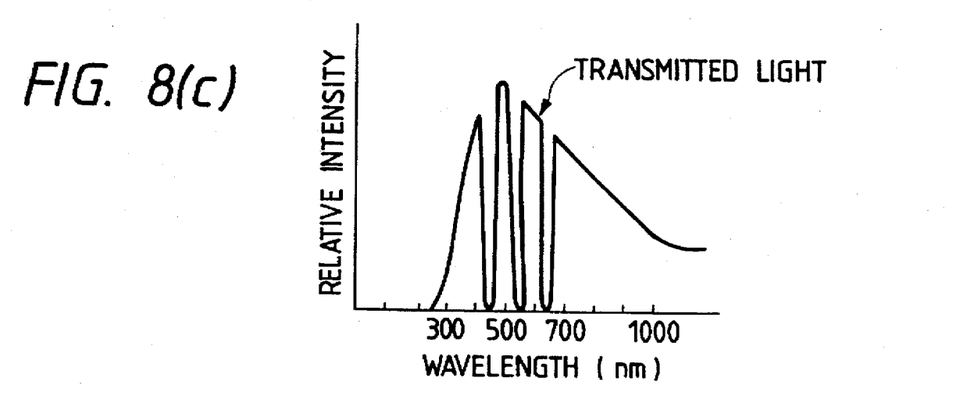
FIG. 8(c) is a graph which shows the relation between light transmitted through a hologram and relative intensity thereof.

However, the hologram 10, as stated above, is designed to assume the diffraction characteristics allowing only red, green, and blue lights to be reflected. Therefore, the light propagated from the outside through the hologram 10 entering the driver's eyes, as shown in FIG. 8(c) which represents wavelength characteristics of light transmitted through the hologram, represents spectra from which the red, green, and blue lights are removed. The background of the displayed images is not colored violet, thereby preventing driver's field of view from being colored artificially.

While the present invention has been disclosed in terms of the preferred embodiment in order to facilitate better understanding thereof, it should be appreciated that the invention can he embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method for forming a multiple-exposure hologram using at least two exposures, comprising:

providing a holographic recording medium;

performing a first exposure of the holographic recording medium to an exposure light under a first exposure condition; and after said first exposure under the first exposure condition, performing a second exposure of the holographic recording medium to the exposure light under a second exposure condition, wherein the first exposure condition is such that the exposure light is radiated on the holographic recording medium at a first incident angle, the second exposure condition being such that the exposure light is radiated on the holographic recording medium at a second incident angle wherein the first and second incident angles are fixed during the first and second exposures, respectively, and are determined based on a change in thickness of the holographic recording medium according to the following equation:

$$[\lambda \cdot \cos\theta m = \lambda_o \cdot \cos[\sin^{-1}\{(\sin\theta)/n\}] \cdot M_z]$$

$$\lambda \cdot \cos\theta m = \lambda_o \cdot \cos[\sin^{-1}\{(\sin\theta)/n\}] \cdot M_z$$

wherein $\theta m$ is one of said first and second incident angles during exposure, $\lambda$ is a wavelength of reconstructed light corresponding to one of said first and second incident angles, $\lambda_o$ is a wavelength of the exposure light during recording, $\theta$ is an angle of reconstructed light coming out of the photographic recording medium during reconstruction, n is an index of refraction of the photographic recording medium, and $M_z$ is defined as a thickness of the holographic recording medium during reconstruction divided by a thickness of the holographic recording medium during exposure, and wherein the reconstruction wavelengths obtained by the first and second exposure at the first and second incident angles are substantially identical to respective target reconstruction wavelength.

2. A method for forming a hologram as set forth in claim 1, wherein the second incident angle is set to a smaller angle than the first incident angle and an exposure energy in the second exposure condition is greater than that in the first exposure condition.

3. A method for forming a hologram as set forth in claim 1, wherein the holographic recording medium comprises a dichromate gelatin.

4. A method for forming a multiple-exposure hologram comprising the steps of:

providing a holographic recording medium;

performing a first exposure of the holographic medium to an exposure light having a given wavelength at an incident angle which is determined according to a first equation based on a change in thickness of the holographic recording medium according to a second equation;

performing a second exposure of the holographic medium to an exposure light having said given wavelength at a second incident angle which is determined according to the first equation based on a change in thickness of the holographic recording medium caused by the step of performing the first exposure of the holographic recording medium according to the second equation; and performing a third exposure of the holographic medium to an exposure light having said given wavelength at a third incident angle which is determined according to the first equation based on a change in thickness of the holographic recording medium caused by the step of performing the second exposure of the holographic recording medium according to the second equation, wherein the first equation is given by the following:

$$[\lambda \cdot \cos\theta m = \lambda_o \cdot \cos[\sin^{-1}\{(\sin\theta)/n\}] \cdot M_z]$$

$$\lambda \cdot \cos\theta m = \lambda_o \cdot \cos[\sin^{-1}\{(\sin\theta)/n\}] \cdot M_z$$

wherein $\theta m$ is an incident angle during exposure, $\lambda$ is a wavelength of reconstructed light, $\lambda_o$ is said given wavelength of the exposure light during recording, $\theta$ is an angle of reconstructed light coming out of the photographic recording medium during reconstruction, n is an index of refraction of the photographic recording medium, and $M_z$ is defined by the second equation as follows:

$$M_z = \frac{\text{(a thickness of the holographic recording medium during reconstruction)}}{\text{(a thickness of the holographic recording medium during exposure)}}$$

$$\left[ = \frac{\text{(the reconstruction wavelength during reconstruction)}}{\text{(target reconstruction wavelength)}} \right]$$

wherein the first, second and third incident angles are fixed during each exposure, and the reconstruction wavelengths obtained by the first, second, and third exposures are substantially identical to respective target reconstruction wavelengths.

* * * * *